United States Patent
Burk

[11] Patent Number: 6,082,040
[45] Date of Patent: Jul. 4, 2000

[54] HOOK GUARD

[76] Inventor: Ryan A. Burk, 1395 Oeth Ct., Dubuque, Iowa 52003

[21] Appl. No.: 09/064,517

[22] Filed: Apr. 22, 1998

[51] Int. Cl.$^7$ .................................................. A01K 85/02
[52] U.S. Cl. ............................................ 43/43.6; 43/43.2
[58] Field of Search .................... 43/43.2, 43.4, 43/42.4, 42.43, 43.6; D22/114

[56] References Cited

U.S. PATENT DOCUMENTS

| | | | |
|---|---|---|---|
| 2,289,265 | 7/1942 | Heddon | 43/43.2 |
| 2,482,881 | 9/1949 | Sonner . | |
| 2,616,209 | 11/1952 | Ploen | 43/54.5 |
| 2,623,321 | 12/1952 | Braukus | 43/43.4 |
| 2,711,611 | 6/1955 | Miner | 43/57.1 |
| 2,775,060 | 12/1956 | Barker . | |
| 2,932,114 | 4/1960 | Meucci | 43/43.6 |
| 2,981,027 | 4/1961 | Dewyer | 43/42.1 |
| 3,363,357 | 1/1968 | Sokol . | |
| 4,217,721 | 8/1980 | Hershberger | 43/43.2 |
| 4,433,503 | 2/1984 | Schleif | 43/42.1 |
| 4,614,054 | 9/1986 | Fovenyessy | 43/43.2 |
| 4,833,814 | 5/1989 | Zygutis | 43/43.2 |

OTHER PUBLICATIONS

"Cabela's" Annual 1995 Spring Catalog, p. 61 (Hook Bonnets), Sidney, NE, USA.

*Primary Examiner*—Kurt Rowan
*Attorney, Agent, or Firm*—Zarley, McKee, Thomte, Voorhees & Sease

[57] ABSTRACT

A hook guard includes a resilient body member having a leg and an arm extending therefrom at an angle substantially different than the angle between the prongs of a hook. The body member has a cavity therein extending into the leg and arm. Due to the resilience of the body member, the leg and arm are capable of being urged into an angle that is substantially the same as the angle between the prongs of the hook. With the leg and arm in that position, the prongs of the hook can be inserted into the cavity and are thereafter frictionally retained by the resilience of the body member when the leg and arm are allowed to return toward their initial positions. The hook guard can also include a second arm extending from the leg at an obtuse angle substantially different than the angle between the prongs of the hook so as to define a Y-shaped body member with a Y-shaped cavity therein for receiving various multiple prong hooks, such as double or treble hooks.

17 Claims, 4 Drawing Sheets

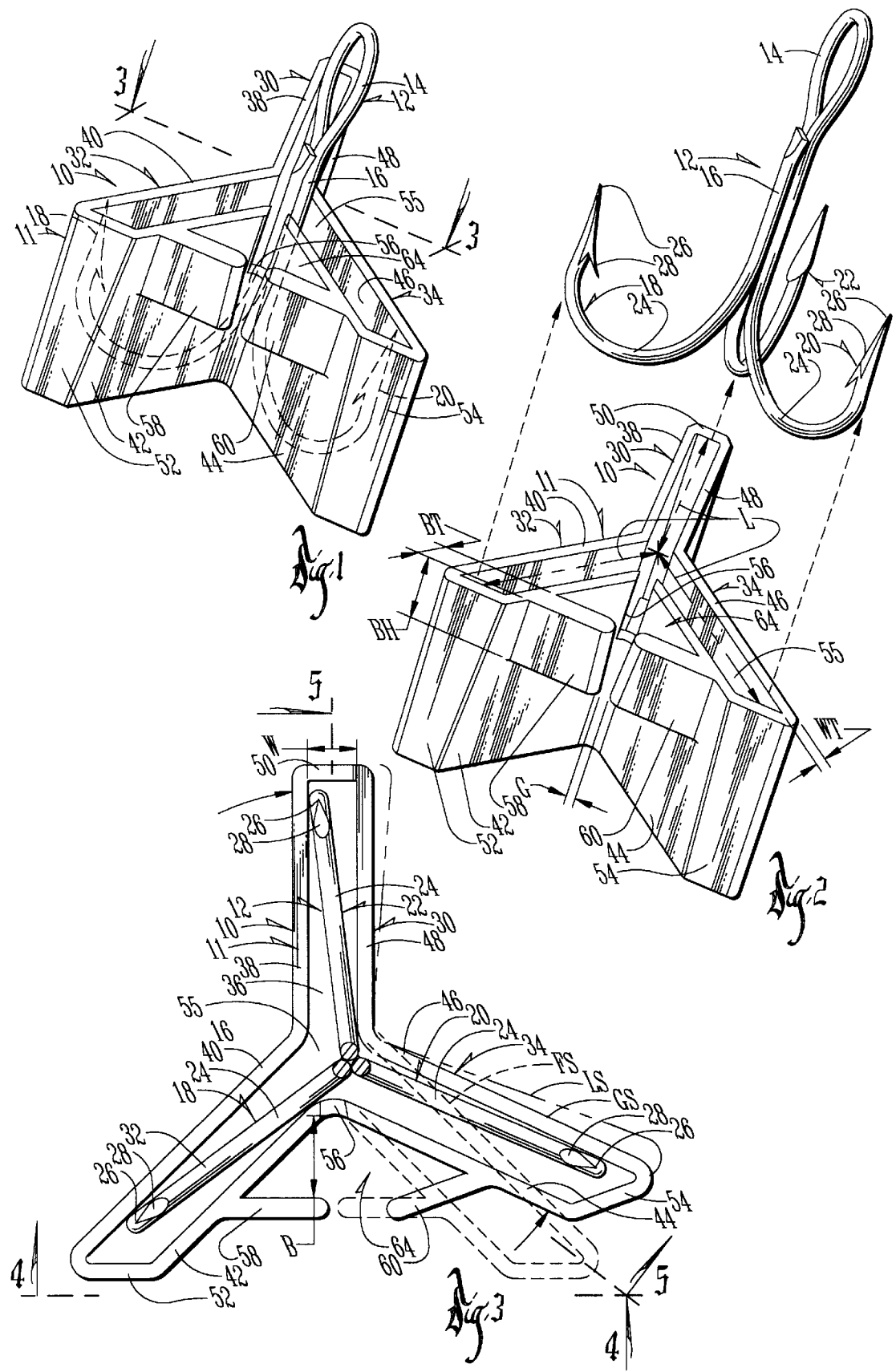

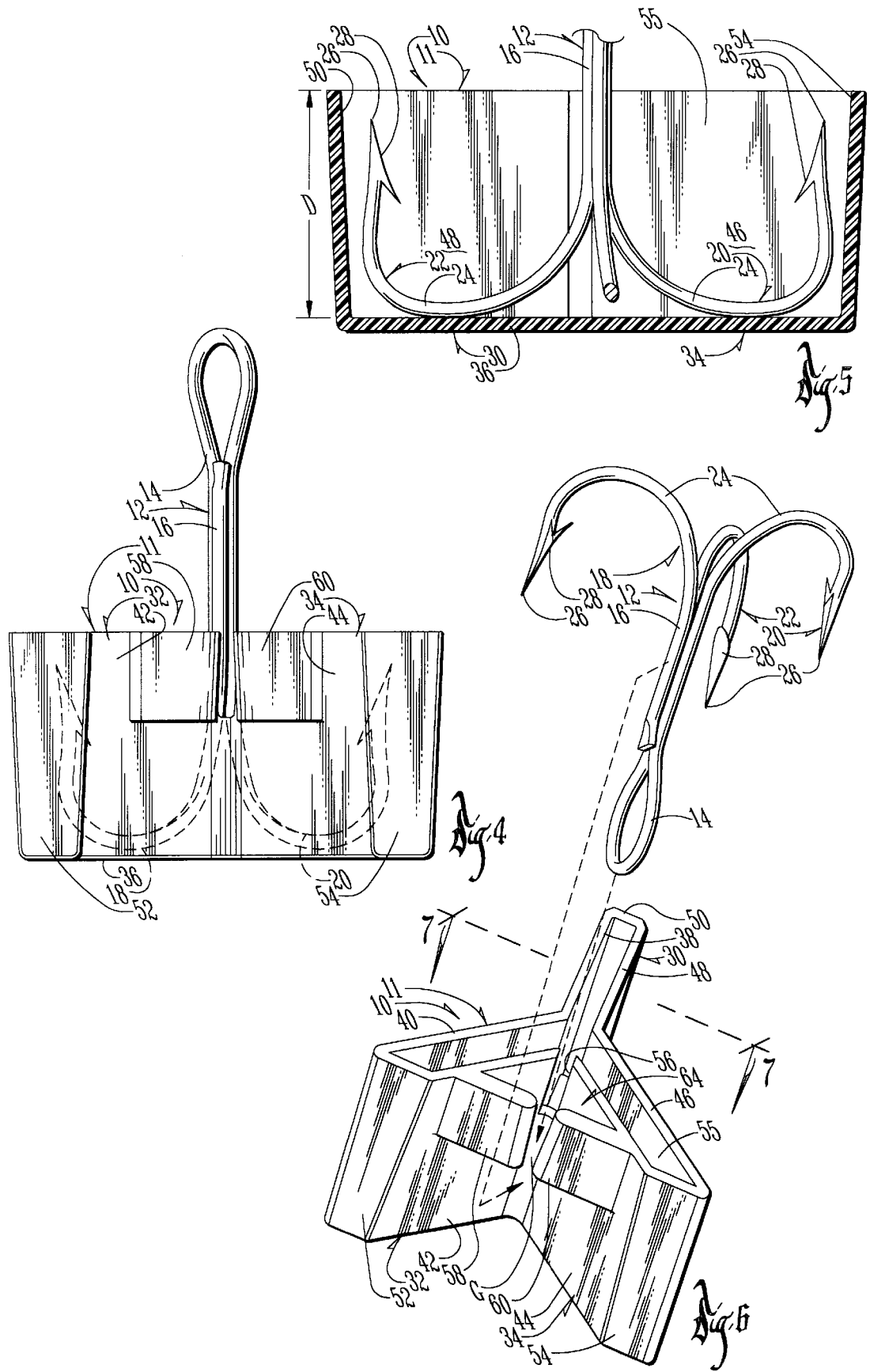

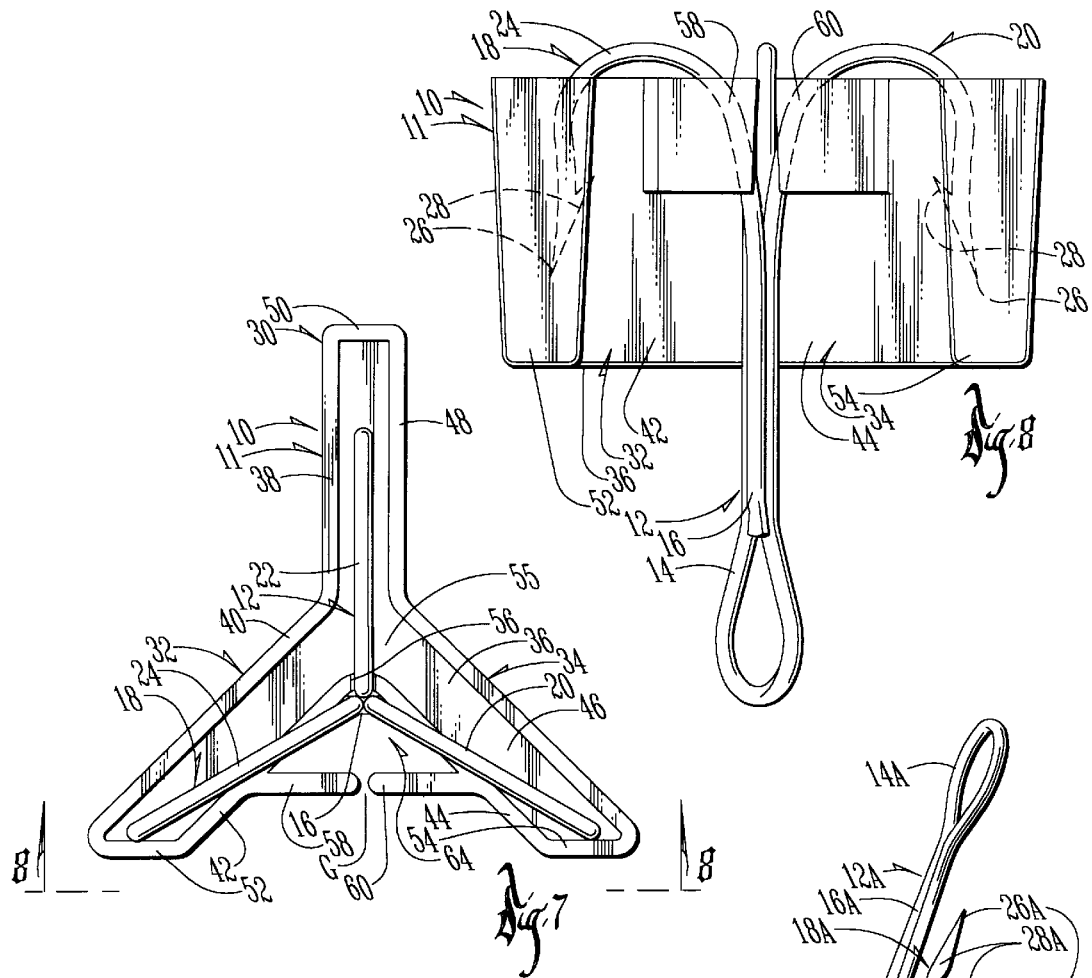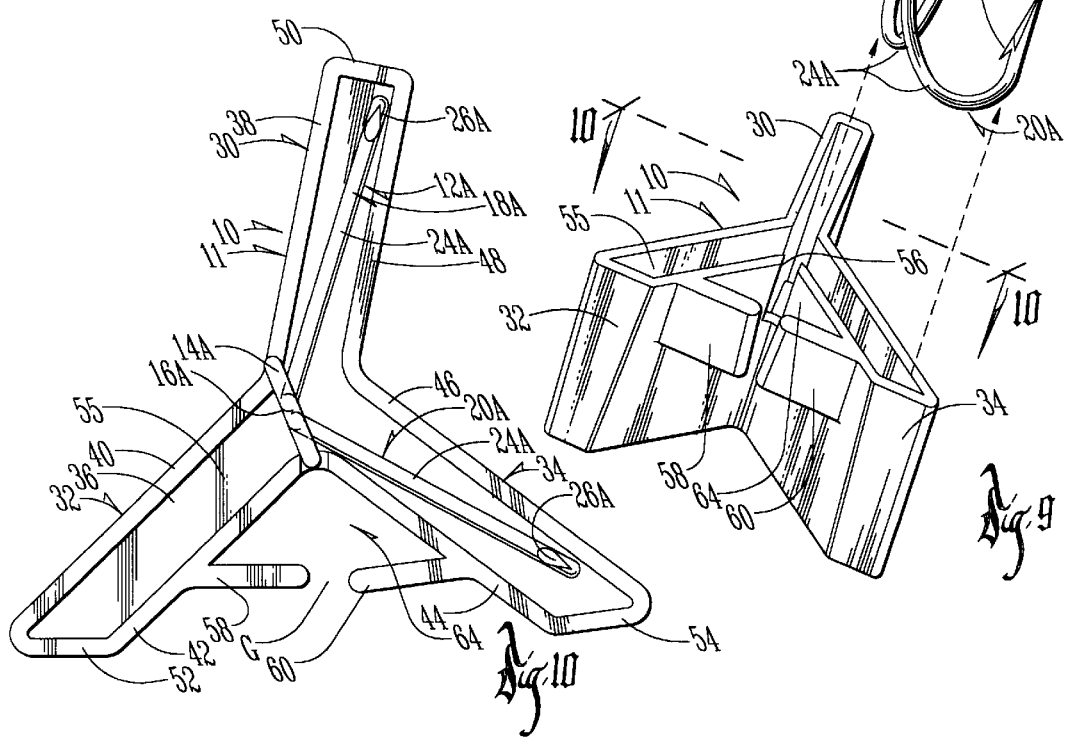

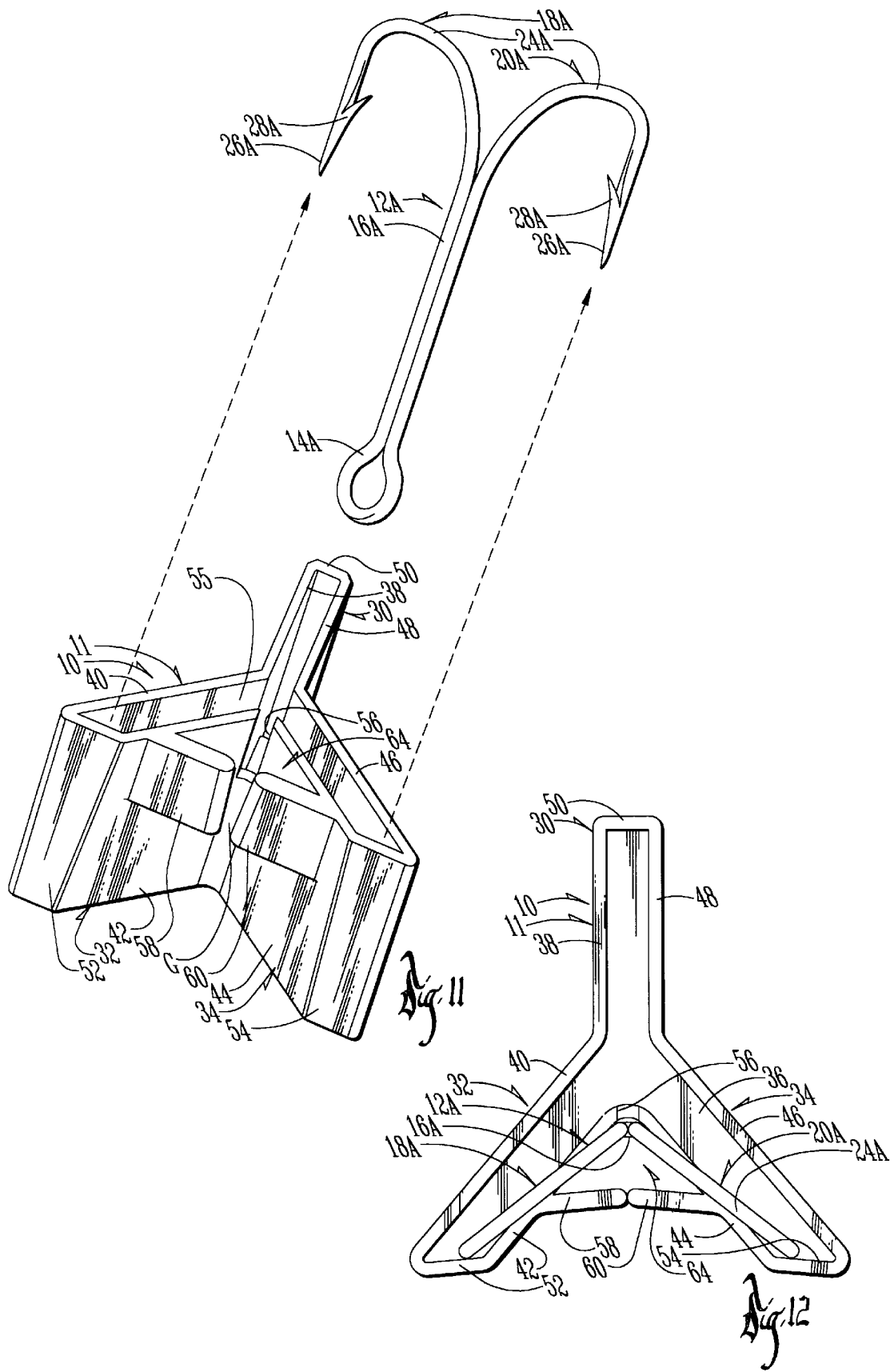

HOOK GUARD

BACKGROUND OF THE INVENTION

The present invention relates to the field of guards for covering fishing hooks and the like. The invention is particularly well adapted to holding and covering double, treble and other specialty multiple prong hooks.

The need to cover or guard the sharp points of fishing hooks when not in use has been painfully clear for a long time. Double hooks, treble hooks and specialty hooks are more challenging to guard because of their complex multiple prong structures. Furthermore, anglers will not use the guard if it is time-consuming or otherwise inconvenient to install and remove. Thus, there is a need for a single device that is capable of efficiently storing and guarding double hooks, treble hooks, and specialty multiple prong hooks.

Hook guards are generally of either the top or bottom mounting variety. The points of the hook are directed into the guard when the guard is top mounted. By contrast, when the points are directed away from the guard, the guard is said to be bottom mounted.

There is a need for an improved guard for multiple prong hooks. Therefore, a primary objective of the present invention is the provision of an improved guard for multiple prong fishing hooks and the like.

Another objective of this invention is the provision of a guard for a multiple prong fishing hook that is more universal in its application than existing hook guards.

Another objective of this invention is the provision of a guard for multiple prong hooks whereby a single guard will hold a range of hook sizes.

Another objective of this invention is the provision of a guard for multiple prong hooks whereby a single guard is capable of holding a double hook, a treble hook, or another specialty multiple hook.

Another objective of this invention is the provision of a versatile guard for multiple prong hooks whereby a single guard is capable of either top mounting or bottom mounting a given hook depending on the preference of the user.

Another objective of this invention is the provision of a guard for multiple prong hooks which is capable of holding a hook prong therein by friction alone, without additional locking structures on the guard.

Another objective of this invention is the provision of a guard for multiple prong hooks that is easily, safely and conveniently installable and removable.

Another objective of this invention is the provision of a guard for multiple prong hooks which is relatively easy to manufacture, durable in use, reliable and inexpensive.

These and other objectives will be apparent from the drawings and the description which follows.

SUMMARY OF THE INVENTION

The present invention relates to a hook guard for a hook having multiple prongs positioned at various angles with respect to one another. In its most basic form, the hook guard of this invention is adapted for use on a double hook. The hook guard includes a resilient body member having a leg and an arm extending therefrom at an obtuse angle substantially different than the angle between the prongs of the hook. The body member has a cavity therein extending into the leg and arm. Because of the resilience of the body member, the leg and arm are capable of being urged into an angle that is substantially the same as the angle between the prongs of the hook. Thereafter, the prongs of the hook can be inserted into the cavity so as to effectively hide the point of the hook. When the leg and arm are released they tend to return to their original positions, but they are prevented from doing so by the prongs of the hook. As a result, frictional gripping forces are created between the prongs of the hook and the inner walls of the leg and arm. Thus, the hook is frictionally retained in the guard.

In its slightly more complex and versatile form, the hook guard of this invention includes a second arm extending from the leg at an obtuse angle substantially different than the angle between the prongs of the hook. The leg and the two arms together define a Y-shaped body member which has a Y-shaped cavity therein. A treble hook may be top or bottom mounted in the Y-shaped cavity and the same guard will also top or bottom mount on a double hook.

For a variety of reasons, including top mounting of hooks, one or more bridge structures may extend from the first arm, second arm, or both to define a gap for inserting the stem of the hook into a triangular-shaped opening formed by the bridge(s) and the crotch of the Y-shaped body member.

The guard of this invention is versatile enough to cover double hooks, treble hooks, and other specialty multiple prong hooks.

BRIEF DESCRIPTION OF THE DRAWINGS

FIG. 1 is a perspective view of the hook guard of the present invention with a treble hook bottom mounted therein.

FIG. 2 is a perspective view similar to FIG. 1, except the treble hook has been withdrawn or positioned above the guard.

FIG. 3 is a top view of the guard of this invention taken along line 3—3 of FIG. 1. FIG. 3 also illustrates that the leg and arms of this resilient guard can be displaced toward one another.

FIG. 4 is a front view of the guard of this invention taken along line 4—4 in FIG. 3.

FIG. 5 is a vertical cross-sectional view of the guard of this invention taken along line 5—5 in FIG. 3.

FIG. 6 is a perspective view showing a treble hook about to be top mounted in the guard of this invention.

FIG. 7 is a top view of the guard of this invention taken along line 7—7 in FIG. 6 and shows a treble hook top mounted therein.

FIG. 8 is a front view of the guard of this invention taken along line 8—8 in FIG. 7 and shows a treble hook top mounted therein.

FIG. 9 is a perspective view of the guard of this invention with a double hook positioned for bottom mounting therein.

FIG. 10 is a top view of the guard of this invention taken along line 10—10 in FIG. 9 and shows a double hook bottom mounted therein.

FIG. 11 is a perspective view of the guard of this invention with a double hook positioned for top mounting therein.

FIG. 12 is a top view of the guard of this invention taken along line 12—12 in FIG. 11 and shows a double hook top mounted therein.

DETAILED DESCRIPTION OF THE PREFERRED EMBODIMENTS

In the drawings and the description which follows, the fishing hook guard of the present invention is generally designated by the reference numeral 10.

Before proceeding with detailed description of the guard 10 of this invention, it will be helpful to review the basic and well known structure of the fishing hook. For instance, a treble hook 12 is shown in FIG. 2. The treble hook, like most hooks, has an eye 14 from which a stem 16 extends. The stem 16 can be a separate structure or can be formed by the joining of the prongs 18, 20, 22 of the hook 12. Because the prongs 18, 20, 22 are substantially identical, only the structure of the prong 18 will be described in greater detail below. However, said description applies to the other prongs 20, 22 as well. The end of the prong 18 opposite the stem 16 terminates in a sharp point 26. A barb 28 extends rearwardly of the point 26. The prongs 18, 20, 22 are radially spaced approximately 120° apart around the stem 16.

The guard 10 comprises a resilient body member 11 formed of a plastic material, such as polypropylene. High flex modulus thermal plastic COPP, available from Huntsman, Inc. of Texas, U.S.A., forms a guard which performs well and can be fabricated using conventional injection molding techniques.

The body member 11 has a leg 30. Two arms 32, 34 extend from the leg 30 at obtuse angles that are substantially different from the angle between the prongs 18, 20, 22 of the hook 12. The arms 32, 34 each extend from the leg 30 at an angle of approximately 135°, but in opposite directions. Thus, the arms 32, 34 are approximately perpendicular to each other in a free state. The arms 32, 34 and the leg 30 all extend the same length L from a central point P.

The body member 11 of the guard 10 includes a generally horizontal bottom wall 36 and a plurality of side walls 38, 40, 42, 44, 46, 48 and end walls 50, 52, 54 extending substantially vertically from the bottom wall 36. The side walls 38, 48; 40, 42; and 44, 46 are substantially parallel to each other and a width W apart at the top. (W' at the bottom) The walls have a thickness of WT. The inner planar surfaces of the walls 36–54 together form a Y-shaped cavity 55 having a depth D for receiving the prongs 18, 20, 22 of the hook 12, as best seen in FIGS. 1, 3 and 5.

Referring again to FIG. 2, a slot 56 having a width SW and a length SL extends downward from the top of the guard 10 at the intersection of the side walls 42, 44. The slot 56 enhances the flexibility or movability of the arms 32, 34 with respect to the leg 30 and with respect to each other. As will become apparent later, the slot 56 also facilitates the removal of the hook 12 and can even receive the stem 16 or other portions of the hook 12 in some mounting configurations.

A bridge 58, 60 extends from each of the side walls 42, 44 respectively at a distance B from the crotch of the Y-shaped body member 11. The bridges 58, 60 are aligned with each other and extend from the arms 32, 34 to form an angle of approximately 90° with respect to the leg 30. The bridges 58, 60 have a thickness of BT and a height of BH. See FIG. 2. The bridges 58, 60 define a gap G therebetween which is large enough to accommodate the stem 16 of the hook 12. As will be seen later, this feature is advantageous when the hook 12 is top mounted in the guard 10. The gap G is tapered such that the gap at the top of the bridges 58, 60 is greater than at the bottom of the bridges. It is also contemplated that a single bridge could be used to define a gap G at one of the side walls 42 or 44.

To bottom mount the treble hook 12 in the guard 10 of the present invention, the user grasps the hook 12 by the eye 14 or the stem 16 and positions it over the guard 10 as shown in FIG. 2. One prong of the hook 12 is aligned with the leg 30 and the other two prongs of the hook 12 are generally aligned with the arms 32, 34. The points 26 of the hook 12 are directed upward. With the other hand, the user grasps the leg 30 at the end wall 50 and one of the arms 32 or 34 at the end wall 52 or 54, respectively, between the thumb and the finger. Next, the user merely squeezes or forces one of the arms 32 or 34 toward the leg 30 until the angle formed between the leg 30 and the displaced arm 32 or 34 is approximately equal to the angle between the prongs 18, 20, 22. The guard assumes a hook receiving position or loading state LS (see FIG. 3). Then the prongs 18, 20, 22 of the hook 12 can be lowered with the other hand into the Y-shaped cavity as shown in FIG. 1. The Y-shaped cavity extends to a depth D sufficient to receive the prongs 18, 20, 22 and fully submerge the points 26 of the hook 12 so that they do not endanger the user (see FIG. 5). When the leg 30 and the displaced arm 32 or 34 are released, they will attempt to return to their initial free state positions (see FIG. 3). As a result, the arms 32 and 34 frictionally grip the prongs 18, 20, 22 with the inner surfaces of the side walls 40, 46 due to the resilience of the material. In short, the arms 32 and 34 of the Y-shaped guard will try to spring back to their initial position. FIG. 3 shows the final resting position or gripping state GS of the legs 30, and the arms 32, 34. The initial position FS is indicated by dashed lines and the hook receiving position or loading state LS is indicated by alternating long and short dashed lines.

The user merely reverses the process to remove the bottom mounted hook 12 from the guard 10. The leg 30 and an arm 32, 34 are squeezed together. Then the hook 12 is pulled upwardly by the eye 14 or stem 16 until it clears the guard 10.

FIGS. 6, 7 and 8 illustrate the use of the guard 10 of this invention for top mounting a treble hook 12. Again, the user grasps the hook 12 by the eye 14 or the stem 16. However, this time the user turns it so the points 26 are directed downward and are at a level just above the top of the guard 10. Then the user inserts the stem 16 into the triangular-shaped opening 64 through the gap G and places the stem 16 adjacent the slot 56. Alternatively, by holding one of the bent portions 24 of the hook 12, the stem 16 can be dropped into the opening 64 from overhead. Next, the user rotates the stem 16 until the points 26 of the hook 12 are generally disposed over the Y-shaped cavity. With the other hand, the user squeezes the arms 32, 34 of the guard 10 together until the bridges 58, 60 meet. The user then moves the hook 12 downwardly until the points 26 touch the bottom wall 36 or the bent portion 24 of the hook contacts the top of the guard, whichever occurs first. Finally, the arms 32, 34 can be released to frictionally retain the prongs 18, 20, 22 of the hook 12 within the guard 10 as shown in FIGS. 7 and 8.

One reverses the process to remove the top mounted hook 12 from the guard 10. The user squeezes the arms 32, 34 together until the bridges 58, 60 meet. Then the hook 12 can be raised until it clears the guard 10.

FIGS. 9 and 10 illustrate how the guard 10 of the present invention can be used to bottom mount a conventional double hook 12A having an eye 14A, a stem 16A, and prongs 18A, 20A. Each of the prongs 18A, 20A includes a bent portion 24A, a point 26A and a barb 28A. The angle between the prongs 18A and 20A is approximately 90°.

Although FIGS. 9 and 10 should make a single arm embodiment of the invention readily apparent to one skilled in the art, for the sake of universality, the same two arm embodiment described previously with respect to a treble hook can be utilized for a double hook. In the case of a double hook 12A, the user grabs the eye 14A at the top of the stem 16A. The double hook 12A is then positioned over the Y'-shaped cavity of the guard 10. The leg 30 and the arm 34 are squeezed or displaced toward each other until they form an angle of approximately 90° to match the angle between the prongs of the hook 12A. The prongs 18A, 20A of the double hook 12A are then inserted into the Y-shaped cavity as shown in FIG. 10. The hook 12A is lowered until the prongs 18A, 20A contact the bottom wall 36 or at least until the points 26A are effectively hidden within the guard. When the arm 34 and the leg 30 are released, they will try to resume their initial angular positions due to the resilience of the material. This generates frictional forces between the inner sides of the side walls 46, 48 and the prongs 18A, 20A. Thus, the prongs 18A, 20A are securely retained in the guard 10. Again, one will note that only the leg and a single arm are needed for bottom mounting the double hook 12A.

One will now recognize that the double hook 12A cannot be bottom mounted with its prongs 18A and 20A in the arms 32, 34 respectively, because the angle between the prongs of the double hook 12A matches the angle between the arms 32 and 34, thus no retentive frictional forces can be developed.

Referring to FIGS. 11 and 12, a double hook 12A can also be top mounted in the guard 10 of this invention. To top mount the double hook 12A, the user grasps the hook 12A by the eye 14A and the stem 16A. The user then positions the hook 12A so that the points 26A extend downward. Then, the user inserts the stem 16A through the gap G with the prongs 18A, 20A directed radially away from the crotch of the Y-shaped cavity and the points 26A suspended just above the top of the guard 10. The top of the stem 16A is tilted rearwardly and brought into contact with the slot 56. The arms 32, 34 of the guard 10 are squeezed together until the bridges 58 and 60 meet. At this point, the points 26A of the hook 12A can be drawn downward into the outer ends of the arms 32, 34 until the prongs 18A, 20A engage the side walls 42, 44, respectively. When one releases the arms 32, 34, the hook 12A is securely retained in the guard 10 by frictional forces.

To remove the hook 12A from the guard 10, the user merely reverse the above process. He or she squeezes the arms 32, 34 together and moves the stem 16A of the hook 12A upward until the points 26A are free. Then, the stem 16A of the double hook 12A is withdrawn from the triangular shaped opening 64 through the gap G.

Although the guard 10 of the present invention is quite versatile, it is virtually impossible for just one guard to cover the entire size range of hooks commonly available. However, it has been found that eight different guards of the style disclosed herein may effectively cover double and treble hooks ranging in size from number 14 to 20/0. The table below suggests some dimensions (in inches) for each guard.

| P/N | SIZE RANGE | W | D | L | W' | WT |
|---|---|---|---|---|---|---|
| 1 | 14–20 | .050 | .180 | .250 | .0374 | .040 |
| 2 | 6–12 | .065 | .350 | .375 | .0406 | .050 |
| 3 | 1–5 | .085 | .500 | .550 | .0501 | .050 |
| 4 | 3/0–1/0 | .110 | .650 | .750 | .0646 | .050 |
| 5 | 7/0–4/0 | .140 | .900 | 1.000 | .0772 | .050 |
| 6 | 10/0–8/0 | .180 | 1.200 | 1.300 | .0962 | .060 |
| 7 | 14/0–11/0 | .225 | 1.500 | 1.650 | .1203 | .070 |
| 8 | 20/0–16/0 | .275 | 1.750 | 2.050 | .1529 | .080 |

W = width of the Y-shaped cavity at the top of the guard
W' = width of the Y-shaped cavity less draft (i.e.--at the bottom)
D = depth of the Y-shaped cavity
L = length of the leg and arm portions of the Y-shaped cavity
WT = wall thickness of side walls and end walls
SW = slot width = ⅔ W less 5° draft/side
SL = slot length = ⅓ D
B = 1½ W
BT = thickness of bridge = .075
BH = height of bridge = ⅓D
G = .020 plus draft
W, D, L, W' are all inside dimensions The dimensional data above is provided to further specify the best mode of carrying out the invention. The dimensions are given for the purpose of illustration only, they are not intended to be limitations. The frictional grip or tightness of the guard on the hook can be increased by reducing W, decreasing L, increasing the wall thickness, and/or using stiffer material.

The guard 10 of the present invention is quite versatile. The guard 10 is adaptable to many different types of specialty multiple prong hooks.

Therefore, it can be seen that the present invention at least accomplishes its stated objectives.

In the drawing and specification there has been set forth a preferred embodiment of the invention, and although specific terms are employed, these are used in a generic and descriptive sense only and not for purposes of limitation. Changes of the form and the proportion of parts, as well as in the substitution of equivalence are contemplated as circumstances may suggest or render expedient without departing from the spirit or scope of the invention as defined in the appended claims.

What is claimed is:

1. A hook guard for a hook having multiple prongs thereon, each of the prongs being positioned at an angle with respect to the other of the prongs, comprising:

a resilient body member having a leg and an arm extending from the leg at an initial angle substantially different than the angle between the prongs of the hook;

the body member having a cavity therein extending into and continuously along both the leg and the arm;

the leg and arm being capable of being urged to form a second angle that is substantially the same as the angle between the prongs of the hook so that the prongs of the hook can be inserted into the cavity and be thereafter frictionally retained therein by the resilience of the body member biasing the leg and arm to return to the initial angle;

a second arm extending from the leg at an initial angle substantially different than the angle between the prongs of the hook;

the leg, the first arm, and the second arm together defining a Y-shaped body member having a Y-shaped cavity therein;

whereby a treble hook can be inserted in the Y-shaped cavity.

2. The hook guard of claim 1 wherein a first bridge extends from the first arm toward the second arm and defines a gap therebetween.

3. The hook guard of claim 2 wherein the bridge is approximately perpendicular to the leg.

4. The hook guard of claim 2 wherein the arms intersect to form a crotch of the Y-shaped body member and the crotch, the arms, and the bridge together define a triangular opening in communication with the gap.

5. The hook guard of claim 2 wherein a second bridge extends from the second arm toward the first arm and is coplanar with the first bridge, the gap being located between the first and second bridge and being of sufficient size to pass a stem of the hook therethrough.

6. The hook guard of claim 1 wherein the arms are approximately perpendicular to each other.

7. The hook guard of claim 1 wherein the arms intersect to define a crotch having a top and a bottom and a slot extends downward from the top of the crotch toward the bottom of the crotch.

8. A hook guard for a hook having multiple prongs thereon, each of the prongs being positioned at an angle with respect to the other of the prongs, comprising:

a resilient body member having a leg and an arm extending from the leg at an initial angle substantially different than the angle between the prongs of the hook;

the body member having a cavity therein extending into the leg and the arm;

the leg and the arm being capable of being urged to form a second angle that is substantially the same as the angle between the prongs of the hooks so that the prongs of the hook can be inserted into the cavity and be thereafter frictionally retained by the resilience of the body member biasing the leg and arm to return to the initial angle;

the leg and the arm both including inner and outer walls that are substantially parallel to each other.

9. The hook guard of claim 8 further comprising a second arm extending from the leg at an initial angle substantially different than the angle between the prongs of the hook; the leg and the first arm and the second arm together defining a Y-shaped body member having a Y-shaped cavity therein; whereby a treble hook can be inserted in the Y-shaped cavity.

10. The hook guard of claim 9 wherein a first bridge extends from the first arm toward the second arm and defines a gap therebetween.

11. The hook guard of claim 10 wherein the bridge is approximately perpendicular to the leg.

12. The hook guard of claim 10 wherein the arms intersect to form a crotch of the Y-shaped body member; and the crotch, the arms, and the bridge together define a triangular opening in communication with the gap.

13. The hook guard of claim 10 wherein a second bridge extends from the second arm toward the first arm and is coplanar with the first bridge, the gap being located between the first and second bridge and being of sufficient size to pass a stem of the hook therethrough.

14. The hook guard of claim 9 wherein the arms are approximately perpendicular to each other.

15. The hook guard of claim 9 wherein the arms intersect to define a crotch having a top and a bottom and a slot extends downward from the top of the crotch toward the bottom of the crotch.

16. A hook guard for a hook having radially spaced prongs thereon, comprising:

a body member having a bottom wall and a plurality of pairs of substantially parallel and resilient side walls extending substantially vertically upward from the bottom wall;

each of the side walls having an outer surface and an inner surface;

the inner surface of the side walls and the bottom wall defining a cavity therebetween;

the cavity having a first portion and a second portion extending at an angle with respect to the first portion;

the angle between the first portion and the second portion of the cavity being substantially different than the radial spacing of the prongs so that the inner surfaces frictionally retain the prongs upon the prongs being inserted into the cavity.

17. A hook guard for a hook having multiple prongs thereon, each of the prongs being positioned at an angle with respect to the other of the prongs, comprising:

a resilient body member having a leg and an arm extending from the leg at an initial angle substantially different than the angle between the prongs of the hook;

the body member having a cavity therein extending into and continuously along both the leg and the arm;

the leg and arm being capable of being urged to form a second angle that is substantially the same as the angle between the prongs of the hook so that the prongs of the hook can be inserted into the cavity and be thereafter frictionally retained therein by the resilience of the body member biasing the leg and arm to return to the initial angle;

the leg and the arm both including inner and outer walls that are substantially parallel to each other.

* * * * *